3,221,810
SWEEP EFFICIENCY IN MISCIBLE
FLUID FLOODS
John W. Marx, Bartlesville, Okla., assignor to Phillips
Petroleum Company, a corporation of Delaware
Continuation of application Ser. No. 65,128, Oct. 26,
1960. This application Mar. 11, 1964, Ser. No. 352,421
8 Claims. (Cl. 166—10)

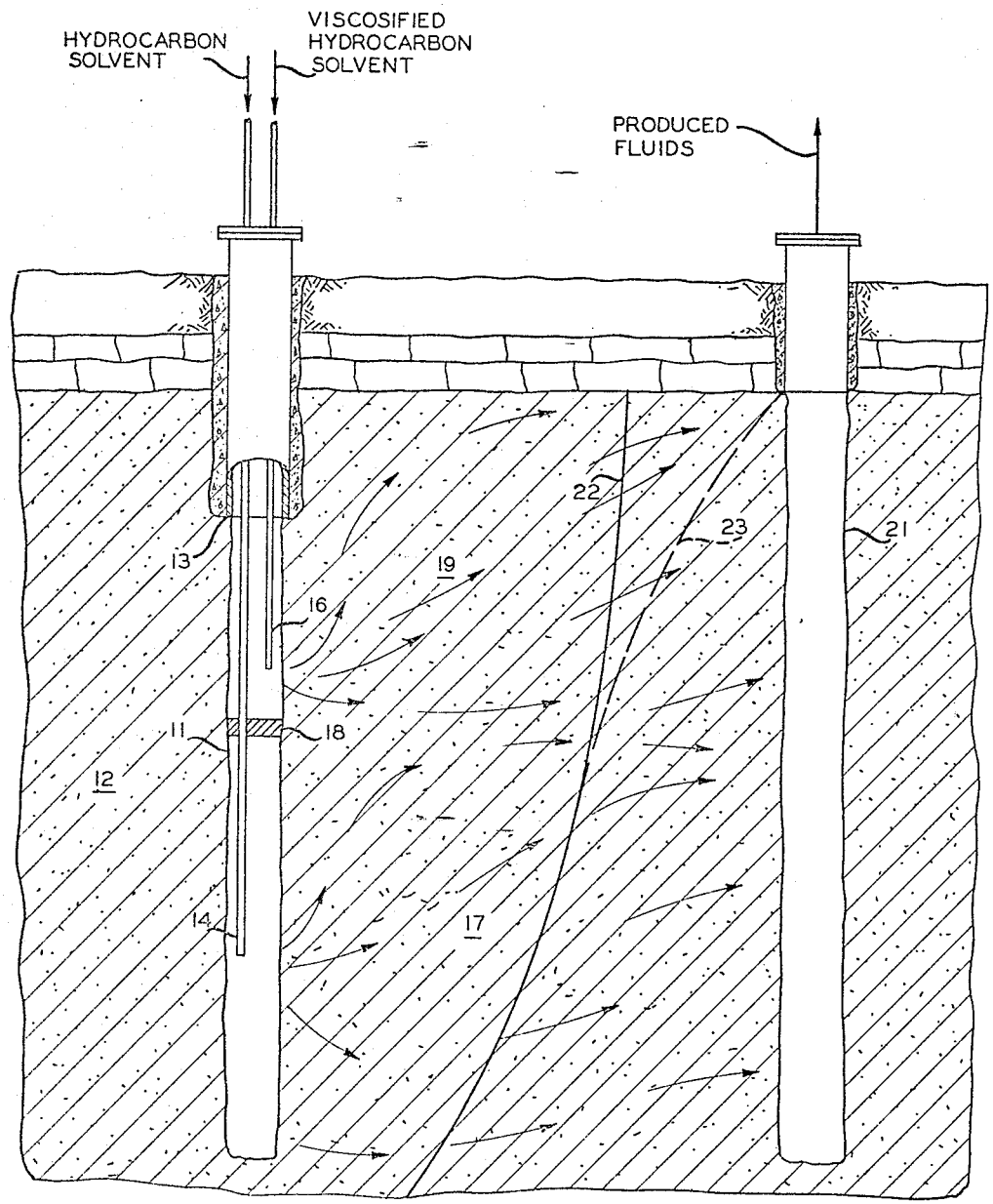
Dec. 7, 1965  J. W. MARX  3,221,810
SWEEP EFFICIENCY IN MISCIBLE FLUID FLOODS
Original Filed Oct. 26, 1960
INVENTOR.
J. W. MARX
BY Hudson & Young
ATTORNEYS United States Patent Office 3,221,810
Patented Dec. 7, 1965

This application is a continuation of application Serial No. 65,128, filed October 26, 1960, now abandoned.

This invention relates to improving the secondary recovery of crude oil where employing the miscible fluid flood procedure. In another aspect, it relates to the addition of viscosifying agents to the hydrocarbon solvent to be injected, thereby decreasing its mobility behind the flooding front. In still another aspect, it relates to selective injection of a viscosified hydrocarbon solvent into the upper pay zone of a porous formation to minimize gravity segregation and improve vertical sweep efficiency. In a still further aspect, the invention relates to maintaining miscibility between the injected hydrocarbon solvent and later injected driving gas or later injected driving water by viscosifying the solvent to permit the required high pressurization of the reservoir.

Secondary recovery by flooding reservoirs with miscible solvents is undergoing extensive development and trial. It is already recognized that volumetric sweep efficiency in a miscible fluid displacement process can be increased by decreasing the mobility behind the flooding front. However, total displacement of the oil in the swept region does not guarantee an efficient recovery process. The amount of oil in place to be recovered is also determined by the fraction of the reservoir contacted by the flooding medium, and this fraction, in turn, is largely determined by the relative mobilities of the fluids.

As a general rule, the miscible solvent is of a lower density, and higher mobility, than the original crude oil in place, so that gravity segregation occurs in the reservoir, causing the solvent to penetrate progressively more rapidly as the top of the pay zone is approached. This leads to premature solvent breakthrough to the producing wells in the upper portion of the pay zone before the full displacement of oil in place has occurred throughout the vertical section of the pay zone.

Quantitative calculations that I have made show that the premature breakthrough, when caused by gravity segregation, can be effectively prevented by the addition of a viscosifying agent, preferably one of the metallic soaps, such as aluminum stearate, to the hydrocarbon solvent prior to its injection. The quantity of viscosifying agent added must be sufficient to render the mobility of the injected miscible solvent less (within the flooded out zone) than the mobility of the displaced fluid ahead of the flood front. This is especially important where the displaced fluids consist principally of oil in place and connate water, if a major benefit is to be achieved by this procedure.

Another problem assoicated with the miscible fluid displacement process is maintaining miscibility between the oil in place and the injected gas. Quite often the oil does not contain enough light hydrocarbons to cause the driving gas to become miscible with the oil at reasonable pressures. This is usually resolved by providing a small band of fluid which fluid is miscible in varying degrees with the oil and the injected natural gas between them. This fluid is, of course, an oil solvent, such as propane. However, in order to conduct a miscible fluid flood operation with propane, for example, as the miscible slug between the reservoir oil and displacing natural gas, a pressure in the reservoir of at least 1150 p.s.i. is required to maintain miscibility between these injected fluids. Up to now, this pressure has been created in a reservoir by filling the same with gas, or water, and pressuring to the required level. For low pressure reservoirs, this may be costly and time consuming. Instead of repressuring the reservoir in this manner, the method of the instant invention achieves the same result merely by the addition of the viscosifying agent of the present invention to the hydrocarbon solvent in a quantity sufficient to require a pressure of at least 1150 p.s.i. in this system to force the solvent through the reservoir.

It is, therefore, an object of the present invention to provide an improved miscible fluid flooding method whereby breakthrough of the miscible solvent and by-passing of oil in place are substantially lessened.

It is another object to improve the vertical sweep efficiency of a miscible fluid flood by the addition of viscosifying agents to the hydrocarbon solvent, which will minimize the effect of gravity segregation of the solvent within the pay zone.

It is yet another object to permit a reservoir operating pressure sufficiently high to maintain miscibility between the oil solvent and the driving natural gas in a miscible fluid flood.

Various other objects, advantages and features of this invention will become apparent to those skilled in the art from a study of the accompanying disclosure and appended claims.

The object of this invention may be accomplished by the addition of the viscosifying agent to the hydrocarbon solvent storage tank in an amount so as to yield a solution ranging between 0.1 and 5.00 weight percent of said agent in said hydrocarbon solvent. I prefer to use as the said viscosifying agent any one of a number of oil-soluble metallic soaps. Among the metallic soaps suitable for use in this invention are: aluminum stearate, calcium stearate, iron stearate, magnesium stearate, zinc stearate, barium stearate, strontium stearate, aluminum oleate, and copper oleate.

Another useful material as a hydrocarbon solvent viscosifier is low molecular polyethylene having a molecular weight range of from 2000 to 5000. Where the hydrocarbon solvent to be injected is liquefied petroleum gas, which is generally stored under pressure, it is convenient to first prepare a masterbatch of the polymer with an organic solvent, before dispersing it with the liquefied petroleum gas.

The polymer may be of a waxy consistency prepared by a high pressure polymerization process using catalysts such as peroxides and may preferably be dispersed in a solvent such as kerosene, heptane, or the like. The resulting polymer dispersion is pumped to the tank wherein the hydrocarbon solvent to be injected is stored.

A preferred form of polymer is Epolene N which is marketed by Eastman Chemical Products, Inc., as a pelleted polymer, having an approximate molecular weight of 2500. This polymer is readily soluble in aromatic and aliphatic hydrocarbons above 180° F. Dispersion of the pelleted form in a liquid medium has obvious advantages over a chunkier form of the polymer as it may be recovered from the polymerization process.

The hydrocarbon solvent which is employed in miscible fluid floods can be any one of a number of hydrocarbon fluids, in addition to the commonly employed liquiefied petroleum gas, propane, for example. Generally, the solvent may be selected from the group consisting of liquefied hydrocarbons of a carbon chain length of 3 to 4 carbon atoms.

Referring now to the drawing, a preferred embodiment of my invention employs two strings of tubing, which may or may not be concentric, disposed within a casing pipe disposed in an injection well. A borehole 11, if not already available, is drilled into the subterranean formation 12, and casing 13 is cemented therein.

The hole is then continued deeper into the formation and two strings of tubing 14 and 16 are lowered therein.

The lower end of lower tubing 14 is initially disposed intermediate the ends of lower pay zone 17. A packer 18 packs off the lower portion of well 11 from the upper portion thereof at a level estimated to be approximately the vertical midpoint of the entire pay zone 12. Tubing string 16 is lowered into the cavern until its lower end is disposed intermediate the surface and said packer 18.

A hydrocarbon solvent, such as propane, is injected into the lower pay zone 17, via tubing 14, disposed in well 11. Simultaneously, a comparable volume of said hydrocarbon solvent, which has been first viscosified with one of the viscosifying agents of this invention is injected into the upper pay zone 19, via tubing 16, and well bore 11. The injection of the hydrocarbon solvent into both zones is continued for a period of time, perhaps 30 days, or generally until at least 2 percent of the calculated pore volume of the formation between the injection well and the producing wells is filled. Then, a second driving fluid, such as natural gas, is injected under high pressure behind the hydrocarbon solvent for an extended period of time.

Because mobility has been reduced and gravity segregation of the solvent has been thus inhibited, the tendency toward premature solvent breakthrough to the upper portion of production well 21 will be substantially overcome until relatively full displacement of oil has occurred throughout the vertical section of the entire pay zone. The flood front will have the appearance similar to that shown by profile 22. It should be remembered, however, that major benefits are achieved according to this invention only when the solvent has been sufficiently viscosified to reduce its mobility to less than the mobility of the displaced fluids.

Illustrative of the difference in profiles which result from when high viscosity solvent is injected selectively into the upper pay section of the homogeneous sand, as compared to when the viscosifier is added to all the injected solvent are shown by profiles 22 and 23, respectively.

Another application of this invention is in the instance where confronted with a vertically inhomogeneuos pay zone. In this case, the selective injection of high viscosity hydrocarbon solvent into the more permeable sections of the pay zone could be practiced. Here also the tendency toward premature breakthrough of solvent in the more permeable sections would be substantially overcome.

For a homogeneous isotropic porous medium, into which miscible solvent is injected at a pressure $P_w$ through the central well of some radial flow pattern, while a back pressure $P_o$ is maintained at the peripheral production wells of said pattern, may be a conventional 4-, 5-, 7-spot pattern, etc., the advance of the flood front at each elevation within the reservoir will be given by the equation:

$$\left[\frac{dr}{dt}\right]_z = \frac{39.8 M_2 [P_w - P_o (d_1 - d_2) gz]}{2\pi r f (S_{oi} - S_{or}) \left[ ln \frac{r}{r_o} + \alpha\, ln \frac{r_w}{r}\right]}$$

where $z$ = elevation in feet above center of pay zone;
$r$ = radial extension of flood front, in feet, at that z-level;
$f$ = formation porosity fraction;
$S_{oi}$, $S_{or}$ = initial and residual oil saturations, respectively;
$r_w$, $r_o$ = well bore and pattern boundary radius, in feet;
$d_1$, $d_2$ = densities miscible solvent (1) and displaced fluids (2);
$g$ = earth's gravity field;
$\alpha = (M_1/M_2)$ = mobility ratio;
$M = (k/\pi)$ = (effective permeability/viscosity) = (mobility);
$M_1, M_2$ = mobilities of solvent (1) and displaced fluid (2);
$P_w$, $P_o$ = injection pressure and radial boundary pressure, respectively;
$t$ = time.

Quantitative evaluation of the above equation for each z-level within the pay zone permits one to calculate the vertical profile of the flood front as it moves from injection (center) well 11 to production (peripheral) wells, such as 21. A simpler equivalent expression also applies to the vertical profile of a line drive flood front, yielding essentially the same predicted results.

Various modifications and alterations of this invention will become apparent to those skilled in the art without departing from the scope and spirit of this invention and it should be understood that the latter is not necessarily limited to the aforementioned discussion.

I claim:
1. In a process for secondary recovery of hydrocarbons from a subterranean porous formation by employing a miscible fluid flood, and wherein gravity segregation of an injected hydrocarbon solvent occurs in the formation, causing the solvent to penetrate more rapidly through the upper portion of a pay zone of said formation thus resulting in premature breakthrough to at least one producing well penetrating said formation, the steps comprising;
    (a) injecting a hydrocarbon solvent via said input well into the lower portion of said pay zone;
    (b) injecting a hydrocarbon solvent containing a viscosifying agent via said input well into a sufficient amount of the upper portion of said pay zone to prevent premature breakthrough caused by gravity segregation, the viscosity of the fluid introduced into said upper portion being greater than the viscosity of the solvent introduced into said lower portion;
    (c) injecting a normally gaseous hydrocarbon into said input well behind both of said hydrocarbon solvents;
    (d) and producing the hydrocarbons in said formation from said at least one producing well, thereby reducing solvent mobility in said upper portion and resulting in improved vertical sweep efficiency.

2. The process of claim 1 wherein said viscosifying agent is a metallic soap selected from the group consisting of aluminum stearate, calcium stearate, iron stearate, magnesium stearate, zinc stearate, barium stearate, strontium stearate, aluminum oleate and copper oleate.

3. The process of claim 1 wherein said hydrocarbon solvent is selected from the group consisting of liquefied hydrocarbons of a carbon chain length of 3 to 4 carbon atoms.

4. The process of claim 1 wherein said viscosifying agent is added to the hydrocarbon solvent in an amount ranging betwen 0.1 and 5.0 weight percent of the hydrocarbon solvent.

5. The process of claim 1 wherein the viscosifying agent is polyethylene having a molecular weight in the range of 2,000 to 5,000.

6. In a process for secondary recovery of hydrocarbons from a subterranean porous formation by employing a miscible fluid flood, and wherein gravity segregation of an injected hydrocarbon solvent occurs in the formation, causing the solvent to penetrate more rapidly through the upper portion of a pay zone of said formation thus resulting in premature breakthrough to at least one producing well penetrating said formation, the steps comprising:
    (a) positioning a packer in an input well at a region between upper and lower portions of a pay zone;
    (b) introducing a hydrocarbon solvent into said input well below said packer so as to inject such solvent into said lower portion of said pay zone;
    (c) introducing a hydrocarbon solvent containing a viscosifying agent into said input well above said packer in an amount sufficient to prevent premature breakthrough caused by gravity segregation so as to inject such solvent containing viscosifying agent into said upper portion of said pay zone, the viscosity of the hydrocarbon solvent containing the viscosifying agent being greater than the viscosity of the solvent introduced below said packer;
(d) injecting a normally gaseous hydrocarbon into said input well both above and below said packer; and
(e) producing the hydrocarbons from said formation from said at least one producing well, thereby reducing solvent mobility in said upper portion and resulting in improved vertical sweep efficiency.

7. The process of claim 1 wherein said upper portion extends from approximately the vertical midpoint of the entire pay zone.

8. The process of claim 6 wherein said packer is positioned approximately at the vertical midpoint of the entire pay zone.

References Cited by the Examiner
UNITED STATES PATENTS

| | | | |
|---|---|---|---|
| 2,887,472 | 5/1959 | Fotis | 252—59 X |
| 2,976,926 | 3/1961 | Maly | 166—9 |
| 3,074,481 | 1/1963 | Habermann | 166—9 |

CHARLES E. O'CONNELL, *Primary Examiner.*